United States Patent [19]

Contreras et al.

[11] Patent Number: 4,938,675

[45] Date of Patent: Jul. 3, 1990

[54] APPARATUS FOR MAKING MULTI-SECTIONED AND MULTI-COLORED SOLID PRODUCTS HAVING A DESIRED GEOMETRIC OR OTHER SHAPE

[76] Inventors: Joseph A. Contreras, 41-303 Mount Kemble Ave., Morristown, N.J. 07960; Gregory P. Contreras, 106 Hauge St., Jersey City, N.J. 07307

[21] Appl. No.: 282,513

[22] Filed: Dec. 12, 1988

[51] Int. Cl.$^5$ .......................... B28D 7/06; B29C 39/12
[52] U.S. Cl. .......................................... 425/121; 249/84; 249/85; 249/128; 249/131; 249/132; 249/155; 264/77; 264/247; 425/125
[58] Field of Search ...................... 249/84, 85, DIG. 1, 249/128, 129, 130, 131, 132, 155; 425/121, 125, 117; 264/77, 245, 246, 247

[56] References Cited

U.S. PATENT DOCUMENTS

| | | | |
|---|---|---|---|
| 537,703 | 4/1895 | Mueller | 264/245 |
| 843,087 | 2/1907 | Jensen | 249/131 |
| 868,261 | 10/1907 | Geanakopulos | 264/133 |
| 1,453,382 | 5/1923 | D'Alessandro et al. | 264/245 |
| 1,454,939 | 5/1923 | Michaelsen et al. | 264/77 |
| 2,244,565 | 6/1941 | Nast | 428/162 |
| 3,173,186 | 3/1965 | Lawrence | 249/39 |
| 3,689,051 | 9/1972 | Miller | 249/131 |
| 4,133,371 | 1/1979 | Birch et al. | 249/129 |
| 4,321,024 | 3/1982 | Terraillon | 425/111 |
| 4,452,419 | 6/1984 | Saleeba | 249/DIG. 1 |
| 4,626,185 | 12/1986 | Monnet | 425/110 |

Primary Examiner—Jay H. Woo
Assistant Examiner—K. P. Nguyen
Attorney, Agent, or Firm—Lerner, David, Littenberg, Krumholz & Mentlik

[57] ABSTRACT

An apparatus for making multi-sectioned and multi-colored products having a predetermined geometric or other shape from different slurry mixtures requires a carrier with a predetermined sized and shaped peripheral wall optionally used with a flat or a contoured support surface, the carrier has; a latticed grid formed by intersecting and interconnected members which define random openings, and at least one or more dividing blade slots so connected in the carrier that the latticed grid is divided into spaced slurry receiving sections, and dividing blades adapted to be removably positioned and repositioned in said dividing blade slots provide means for alternatively and selectively isolating the respective spaced slurry receiving sections so that different slurry mixtures can be poured into each of the isolated spaced slurry receiving sections to harden therein about the carrier to form a furnished integral product.

13 Claims, 13 Drawing Sheets

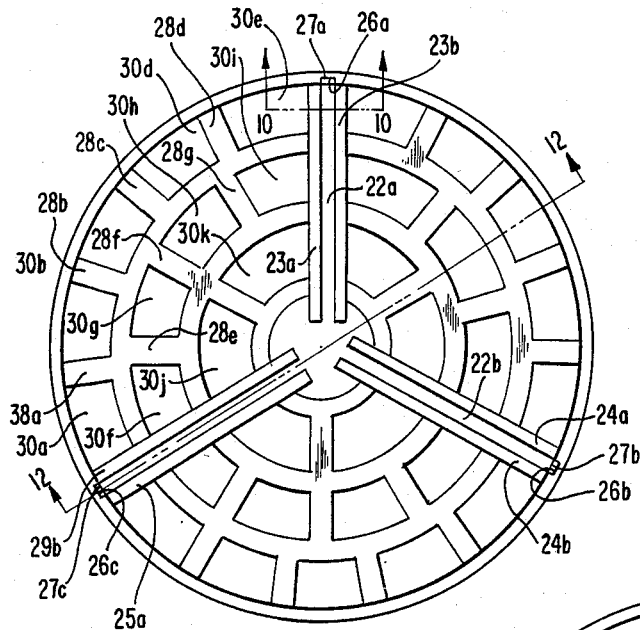
FIG. 7
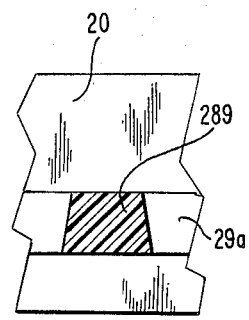
FIG. 9
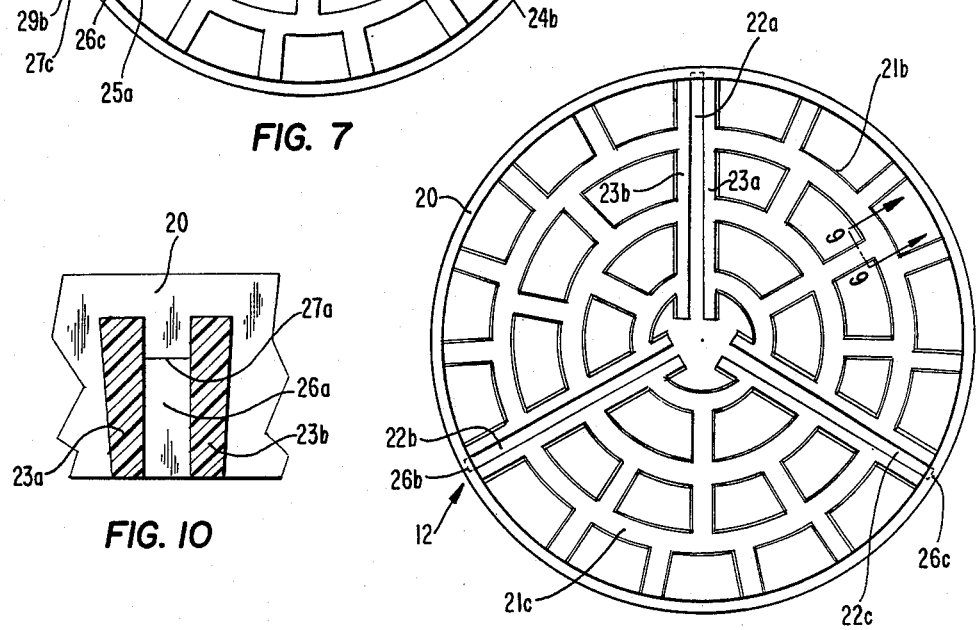
FIG. 10
FIG. 8
FIG. 11
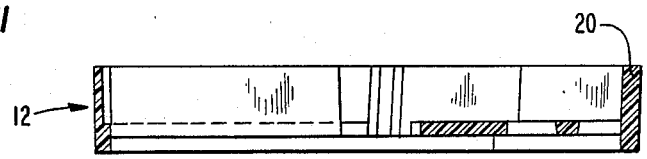
FIG. 12

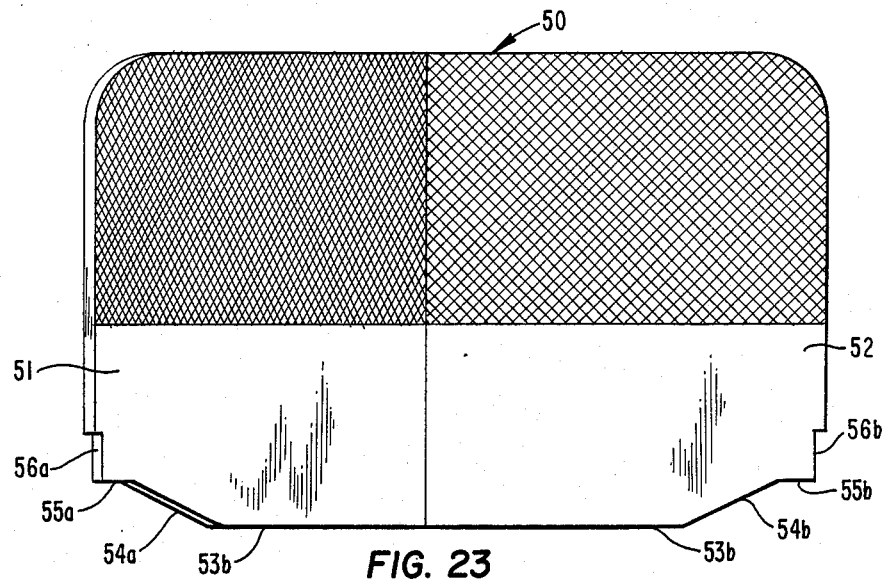
FIG. 23
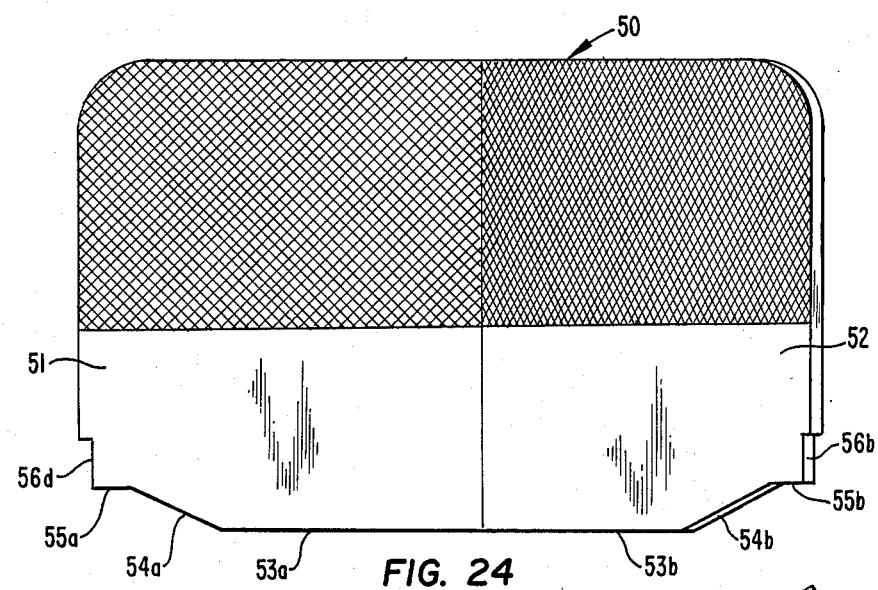
FIG. 24
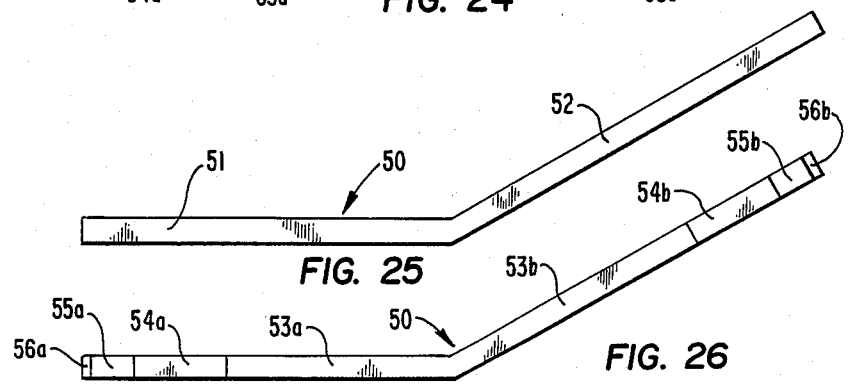
FIG. 25
FIG. 26 ved in the manufacturing of the final multi-sectioned and multi-colored solid product.

APPARATUS FOR MAKING MULTI-SECTIONED AND MULTI-COLORED SOLID PRODUCTS HAVING A DESIRED GEOMETRIC OR OTHER SHAPE

BACKGROUND OF THE DISCLOSURE

This invention relates generally to Apparatus and Methods for making solid products and more particularly to an Apparatus and Method for making single colored and preferably multi-sectioned and multi-colored solid products of predetermined geometric and other shapes for use as pancake make-up, eye-shadow, lipstick, paints, and the like types of products which can be mounted in compacts, paint boxes, and other containers generally used for cosmetics, artists supplies, and in other industries, and hobbies, where coloring materials are required.

It is well known in the cosmetic and paint industries that single colored slurry mixtures of cosmetics or paints can be poured into a sized, shaped, and formed casting mold and permitted to harden therein to provide with the casting mold a unitary product that can be mounted in openings or internal support members formed in a suitable compact, other cosmetic container, or in an artist's paint box.

This hardened solid product particularly in the case of the finer cosmetic materials and paints cannot be removed from the casting mold in which it is formed because it is too fragile and will disintegrate. Thus, it has been found to be impractical to handle the solid product apart from the casting mold in the manufacture of containers in which this type of product is mounted. Additionally, the product which includes the casting mold increases the cost of manufacture of the final compacts and other containers which include these products and are offered in the commercial marketplace to the ultimate users.

Additionally, the casting molds take up valuable space and mandate the formation of supporting devices or other structures in the container adapted to receive these unitary products.

The present invention seeks to provide an Apparatus and Method for forming a single or multicolored product having a predetermined size and shape which can overcome these and other problems in the prior art.

The product in accordance with the present invention, in the case of single colored product, is formed from a slurry mixture having a single color which is poured into an apparatus having a sized and shaped, generally disposable casting mold, and a uniformly latticed grid mounted in the casting mold. The slurry mixture is permitted to harden about the latticed grid by evaporation or removal of the solvent used to establish the slurry, and then removed with the latticed grid member to provide the finished single colored unitary solid product in the desired shape.

The product in accordance with the present invention, in the case of a multi-section and multi-colored solid product, is formed from a plurality of slurry mixtures each having a different color and texture which are alternatively and selectively poured into separately formed sections of an Apparatus having a sized and shaped generally disposable casting mold, a sized and shaped latticed grid mounted in the casting mold having a predetermined number of grid sections, separated from each other by extended dividing blade slots, and removable and replaceable dividing blade means operatively connectible in the extended dividing blade slots in the latticed grid are so operatively associated with the latticed grid and the casting mold that by positioning, removal, and repositioning of the dividing blade means, sized and shaped grid sections are formed into which one of the respective slurry mixtures are alternatively and selectively poured, permitted to set or harden by evaporation or removal of the solvent used to establish the slurry, and then the multi-sectioned and multi-colored solid member is removed with the latticed grid as a unitary member to provide the finished solid product in the desired size and shape.

SUMMARY OF THE INVENTION

Thus, the present invention covers Apparatus for forming multi-sectioned and multi-colored solid products of predetermined size and shape from a plurality of differently colored slurry mixtures which includes, a generally sized and shaped disposable casting mold having a compartment, a latticed grid means disposed to fit into the compartment for operative association with the casting mold, said grid means having spaced dividing slots defining spaced grid sections, and at least one dividing blade means disposed for removable and replaceable positioning and repositioning in the spaced dividing slots in the grid means when the grid means is in assembled position in the casting mold for alternatively and selectively isolating the spaced grid sections one from the other to enable each of said grid sections to receive one of said plurality of differently colored slurry mixtures therein.

Additionally, the method of forming a multi-sectioned and multi-colored solid product of predetermined size and shape from a plurality of differently colored slurry mixtures including the steps of forming and assembling a support and operatively associated grid means having the desired size and shape for the solid product to be formed, providing the grid means with dividing slots for defining spaced grid sections, removably positioning and repositioning dividing blades in the dividing slots, positioning the dividing blades to isolate one of said spaced grid section, pouring one of said differently colored slurry mixtures into the one isolated grid section in the casting mold, permitting the slurry mixture to solidify, removing and repositioning the dividing blade to isolate at least a second grid section in said casting mold, pouring a second of said differently colored slurry mixtures into the second isolated grid section, permitting the second slurry mixture to solidify, separating the dividing blade means, and separating the grid section with the solidified multi-sectioned and multi-colored material thereon.

Additionally, the method as above described in which at least three or more grid sections are isolated and established to receive additional differently colored slurry mixtures which are permitted to solidify to provide a final product having at least three or more differently colored sections.

Accordingly, it is an object of the present invention to provide a simple low cost Apparatus for forming a multi-sectioned and multi-colored solid product having a predetermined geometric or other shape.

It is another object of the present invention to provide a simple low cost disposable Apparatus in which the elements of the Apparatus provide means for dividing the Apparatus into sections so that a plurality of suitable colored materials can be alternatively and selectively formed therein adjacent to each other to form a single unitary solid multi-sectioned and multi-colored product.

With these and other objects in view the present invention will be better understood by reference to the following description when taken in conjunction with the drawings in which:

DESCRIPTION OF THE FIGURES

FIG. 7 is a top plan view of the sectioned or compartmented and latticed grid for the form of the invention shown in FIG. 1.

FIG. 8 is a bottom plan view of the latticed grid shown in FIGS. 1 and 7.

FIG. 9 is a cross-section taken on line 9—9 of FIG. 8.

FIG. 10 is a cross-section taken on line 10—10 of FIG. 8.

FIG. 11 is a side view of the latticed grid shown in FIGS. 1, 2 and 7.

FIG. 12 is a cross-section taken on line 12—12 of FIG. 7.

FIG. 23 is a right side view of the angled form of dividing blade means shown in FIG. 22.

FIG. 24 is a left side view of the angled form of dividing blade means shown in FIG. 22.

FIG. 25 is a top view of the angled form of dividing blade means shown in FIG. 22.

FIG. 26 is a bottom view of the angled form of dividing blade means shown in FIG. 22.

DESCRIPTION OF ONE PREFERRED EMBODIMENT OF THE INVENTION

The present invention will be described with reference to the Apparatus shown in the FIGURES of the drawings for making multi-sectioned and multi-colored solid products in accordance with the more complex methods of the present invention. Those skilled in the art will readily recognize that the single colored product can be established by simplifying the Apparatus and Methods as is hereinafter more fully described so as to utilize a given casting mold and an associated uniform latticed grid sized and shaped to fit the casting mold and limiting the procedure to a single colored slurry mixture.

Figure 1:
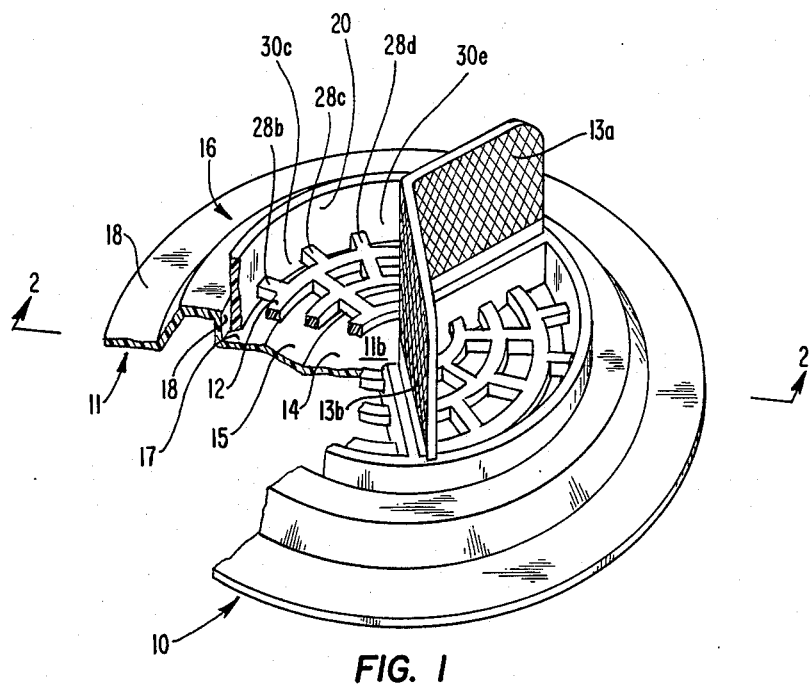
FIG. 1 is a perspective view of one form of Apparatus for forming a multi-sectioned and multi-colored solid product in accordance with the methods of the present invention, partly in vertical section.

Thus, referring to the drawings FIG. 1 shows one form of Apparatus generally designated 10 for making multi-sectioned and multi-colored solid products in accordance with the present invention for pancake make-up. Apparatus 10 has a casting mold 11, which defines a sized and shaped molding cavity as at 11A, a sectioned or compartmented and latticed grid 12 which is mounted in the casting mold, and dividing blade members as at 13a and 13b which are removable and replaceably mounted, for positioning and repositioning the dividing blade members, in the sectioned latticed grid when the latticed grid 12 is in assembled position in the casting mold 11.

The casting mold provides the desired predetermined geometric or other shape for the multi-colored solid product to be formed. The sectioned and latticed grid provides the means for establishing the respective independent sections and different colors in the given solid product, and as a carrier or frame for the finished product, as will now be described.

The Casting Mold

The casting mold in addition to providing the desired predetermined geometric or other shape for the multi-sectioned and multi-colored solid product to be formed can also have any desired size.

In the form of the present invention illustrated in the FIGURES of the drawings, since the Apparatus is used for making pancake make-up or eye shadow, it will be relatively small. Thus, the casting mold 11 will have an approximate diameter of 1.375".

Casting mold 11 is preferably formed of a cheap disposable material. In the mass production of the multi-sectioned and multi-colored solid products for making pancake make-up in accordance with the present invention, the casting molds are stuck or vacuum formed in as many units as possible for the given size and shape of the final product. For example, a plurality of individual casting molds are formed seriatum and in spaced relationship on a sheet of polyvynalchloride (PVC), coated egg carton material, or other relatively cheap and disposable material which can withstand the conditions for forming the multi-sectioned and multi-colored solid products in accordance with the methods of the present invention.

FIGS. 1 to 6 show that the casting mold 11 has a relatively simple pie plate shape. Thus, casting mold 11 is a generally annular member having a flat center section 14 and a sloped annular section 15 connected at its lower section to the outer peripheral edge of the flat center section 14. Connected about the upper end of the sloped annular section 15, is a convoluted annular flange 16.

Convoluted annular flange 16 has an inner annular support shelf 17 which is disposed about and connected to the upper edge of the sloped annular section 15, and a generally annular vertical wall 18 continuous with the outer periphery of the support shelf 17 remote from the point of connection of the support shelf 17 to the upper edge of the sloped annular section 15. Together, the support shelf 17 and vertical wall 18 serve to receive and support the sectioned or compartmented latticed grid 12 in assembled position. Those skilled in the art will readily recognize that there are other ways of supporting and/or locking the grid 12 in assembled position for the casting mold 11 without departing from the scope of the present invention.

Figure 2:
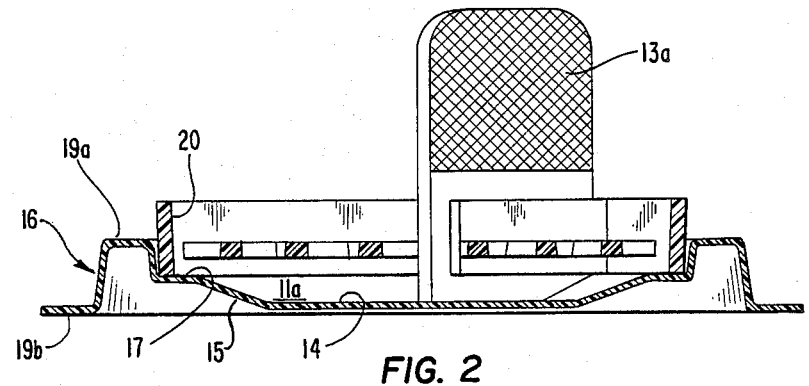
FIG. 2 is a cross-section taken on line 2—2 of FIG. 1.
Figure 3:
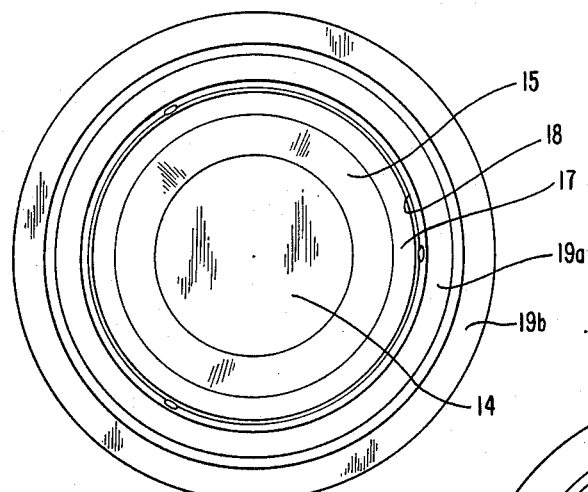
FIG. 3 is a top plan view of the casting mold for the form of the Apparatus shown in FIGS. 1 and 2.
Figure 4:
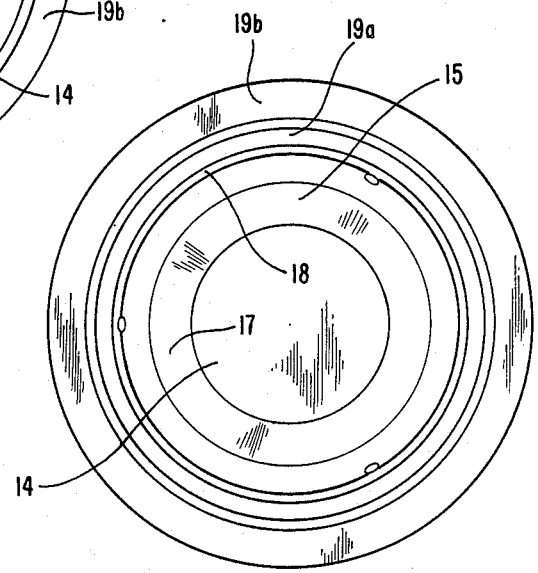
FIG. 4 is a bottom plan view of the casting mold shown in FIGS. 1, 2 and 3.
Figure 5:
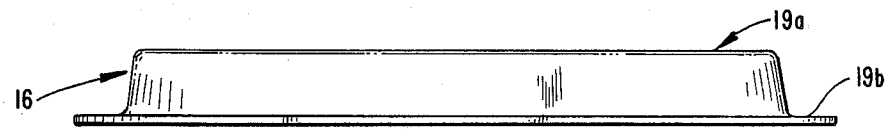
FIG. 5 is a side view of the casting mold shown in FIGS. 1 to 4.
Figure 6:
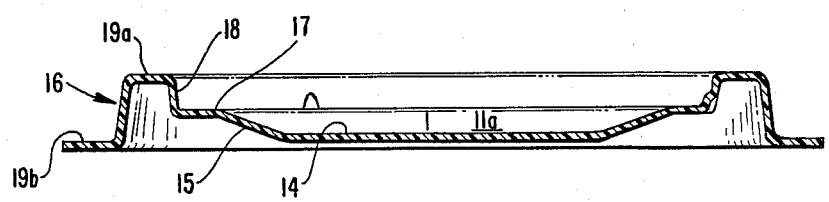
FIG. 6 is a cross-section taken on line 6—6 of FIG. 3.

Further, the convoluted annular flange 16 outboard of and continuous with the annular vertical wall section 18 has a support for the casting mold 11 which includes, an annular rim 19a and an annular base 19b generally L-shaped in vertical section. Annular rim 19a and annular base 19b are disposed a spaced distance from the sloped annular side section 15. Together they serve to hold the assembled apparatus firmly while the steps of the methods in accordance with the present invention for making the desired multi-sectioned and multi-colored solid product are followed, all of which is shown in FIGS. 1 and 2 of the drawings.

The Compartmented Latticed Grid

The compartmented latticed grid 12 is precisely molded from a more durable material than the casting mold because it serves as the carrier and frame for the multi-sectioned, multi-colored solid product which is formed thereon. Thus the compartmented and latticed grid used in operative association with the casting mold may be made of ABS; Nylon, polycarbonate, and other durable materials to provide a strong final product that will not disintegrate under the conditions which are met during the formation of the product and its later handling and insertion or attaching into assembled position in the particular container in which it is used.

At FIGS. 1, 2 and 7 to 14, the sectioned or compartmented grid 12 is shown as generally round in shape. The shape and the diameter or other dimensions of the latticed grid 12 are a function of the dimensions in size and shape of the associated casting mold 11 which is in turn controlled by the desired size of the multi-sectioned and multi-colored product to be fabricated. About the outer periphery of the latticed grid 12 is an annular frame 20. Formed and connected to the medial section of the inner wall of the frame 20 are a plurality of spaced latticed sections as at 21a, 21b and 21c, and between the spaced latticed sections are sized channels or slots as at 22a, 22b and 22c.

The spaced latticed sections are equivalent in number, size and shape to the number, size and shape of the different colored materials to be formed in the multi-sectioned and multi-colored solid product in accordance with the methods of the present invention.

Figure 14:
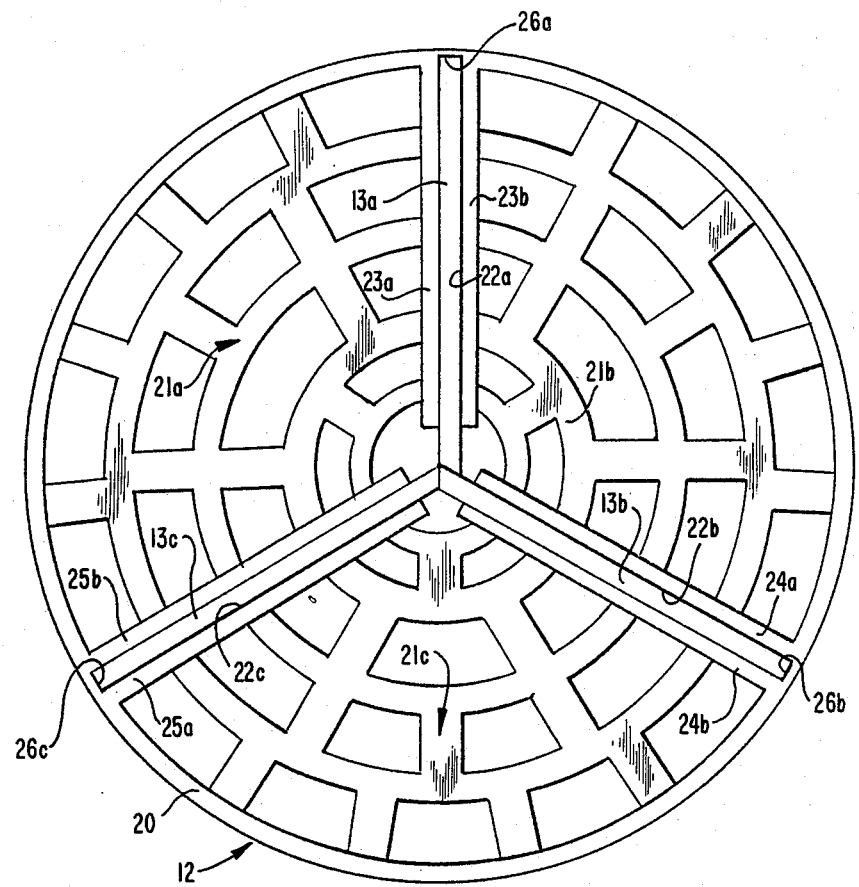
FIG. 14 is an enlarged top plan view of the latticed grid shown in FIGS. 1, 2 and 7 with dividing blade means in the radially extending slots between the grid sections formed on the latticed grid.
Figure 13:
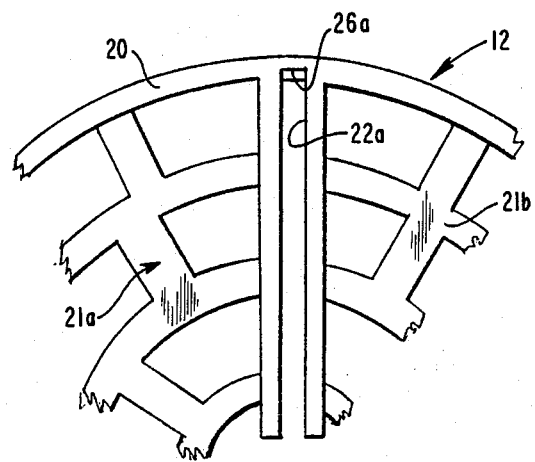
FIG. 13 is an enlarged top plan view of a fragment of one of the grid sections of the grid shown in FIG. 7.
Figure 15:
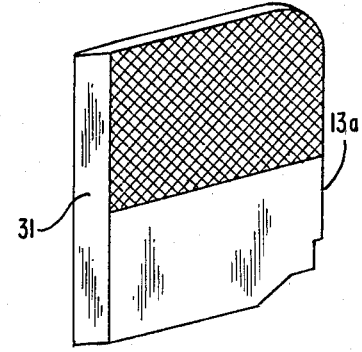
FIG. 15 is a perspective view of a left beveled edge dividing blade means for the form of the invention shown in FIG. 1.
Figure 16:
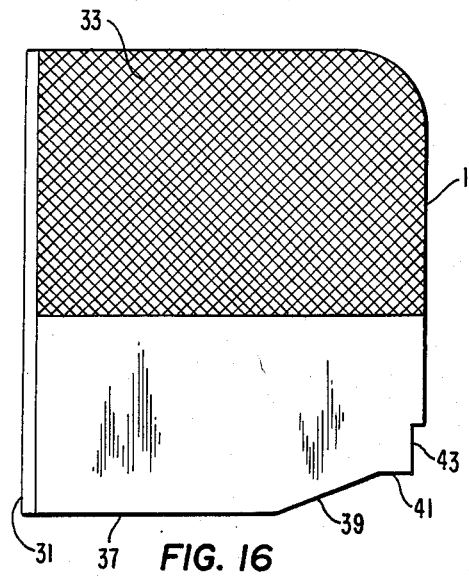
FIG. 16 is a side view of the left beveled edge dividing blade means shown in FIGS. 1 and 15.
Figure 19:
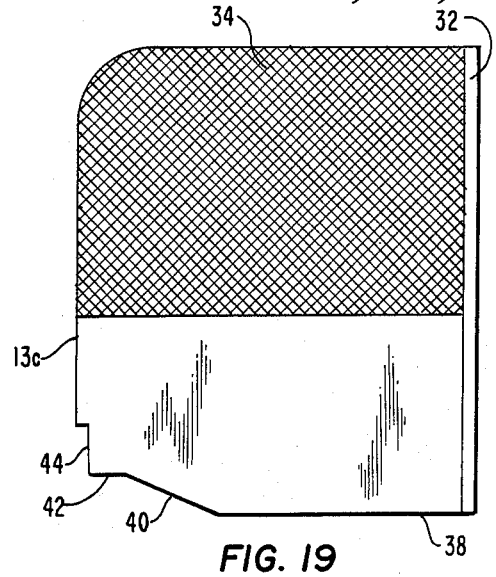
FIG. 19 is a side view of a right beveled edge dividing blade means.
Figure 17:
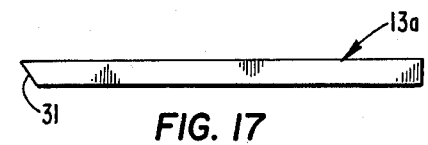
FIG. 17 is a top view of the left beveled edge dividing blade means shown in FIGS. 1, 15 and 16.
Figure 20:
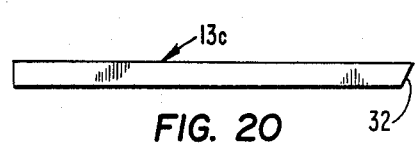
FIG. 20 is a top view of the right beveled edge dividing blade means shown in FIG. 19.
Figure 18:
FIG. 18 is a bottom view of the left beveled edge dividing blade means shown in FIGS. 1, 15 and 16.
Figure 21:
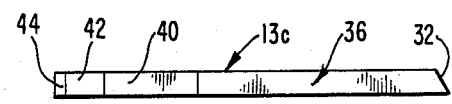
FIG. 21 is a bottom view of the right beveled edge dividing means shown in FIG. 19.

The slots or channels 22a, 22b and 22c between the spaced latticed sections 21a, 21b and 21c are sized to receive the dividing blade members 13a and 13b and 13c as shown in FIG. 1, 2 and 14 of the drawings. Dividing blades 13a, 13b and 13c act in assembled position to enable first one of the spaced sections to receive a first slurry material of a given color. Then after the first portion of slurry material sets or hardens the associated dividing blade or blades are removed and repositioned in the proper slots or channels 22a, 22b or 22c to form or prepare a second section on the latticed grid adjacent the first solidified slurry material to receive a second slurry material having a different color. This second portion of slurry material is then poured and allowed to set or harden into position next to first solidified material in the first section. Then, the dividing blade or blades are removed and this effectively forms and prepares the third section on the latticed grid adjacent the first and second solidified positions of slurry material, to now receive a third slurry material of an even further different color which is poured into this third section and permitted to set or harden.

Those skilled in the art will readily recognize that while only three channels or slots 22a, 22b and 22c for the three associated latticed sections 21a, 21b and 21c are illustrated that the compartmented latticed grid 12 may have more or less latticed grid sectioned for a specific multi-sectioned and multi-colored solid product as may be required for a given application without departing from the scope of the present invention.

Where there are additional latticed grid sections in excess of three, then as above described the removal and repositioning of the dividing blades is repeated for as many additional latticed grid sections as may be required until the last section to be filled is reached, and for the last section all dividing blades are removed and the space then formed is thereafter filled to complete the fabrication of the desired product in accordance with the methods of the present invention.

The compartmented latticed grid 12 becomes an integral part of the final product in the course of the formation or fabrication thereof, as above described. Therefore, the latticed grid must be precisely molded both to form the spaced sections 21a, 21b and 21c and the slots or channels 22a, 22b and 22c in which the dividing blade members 13a, 13b and 13c are positioned, removed and repositioned to form the multi-sectioned and multi-colored solid product in accordance with the methods of the present invention.

Now referring to FIGS. 7 to 14, inclusive, dividing blade slots or channels 22a, 22b and 22c are each formed by two elongated generally parallel members spaced for a generally sliding but snug fit with the dividing blade members 13a, 13b and 13c which are positioned, removed and repositioned in the respective dividing blade slots or channels in accordance with the methods of the present invention. Thus the elongated members 23a and 23b define the dividing blade slot 22a; the elongated members 24a and 24b define the dividing slot 22b, and elongated members 25a and 25b define the dividing blade slot 22c.

The elongated members 23a, 23b, 24a, 24b, 25a and 25b are each connected at their outer end to the inner wall of the annular frame 20 and extend radially inward to a free end. As a result the dividing blade slots or channels 22a, 22b and 22c are open at the end remote from the inner wall of the annular frame 20. Thus, a given dividing blade, even though longer than the dividing blade slot, can be fitted into assembled position so that they can coact with each other to isolate a given grid section on the compartmented latticed grid 12 and to define an associated lower section 11b in the molding cavity 11a below the isolated grid section as is illustrated in FIG. 2 of the drawings, into which the slurry mixture can be poured to form one of the multi-sections of the desired multi-sectioned and multi-colored solid product.

FIGS. 7, 10, 12, 13 and 14 further show that the inner wall of the annular frame 20 has cut-outs as at 26a, 26b and 26c which are respectively in alignment with the dividing blade slots 22a, 22b and 22c and include shelves or shoulders as at 27a, 27b and 27c. These cut-outs are engaged by the dividing blades and serve to align and hold the respective dividing blades 13a, 13b and 13c when they are positioned and or repositioned in the dividing blade slots in accordance with the methods of the present invention.

Grid sections 21a, 21b and 21c of the latticed grid 12 are operatively associated with the adjacent dividing blade slots when the dividing blades are in assembled position therein. These grid sections are each formed, for example for the grid section 21a, by a plurality of radially extending, spaced and offset ribs as at 28a, 28b, 28c, 28d, 28e, 28f, 28g, 28h and concentrically spaced circumferential members 29a and 29b intersecting and interconnected to each other and connected to the elongated members 23a and 25b defining the adjacent dividing blade slots 22a and 22c so that a corresponding plurality of windows or openings as at 30a, 30b, 30c, 30d, 30e, 30f, 30g, 30h, 30i, 30j and 30k are formed which extend through and thus form the latticed grid 12.

Thus, when the latticed grid 12 is in assembled position and the grid section 21a is isolated by the dividing blade or blades, as above described, the slurry mixture when poured into the grid section 21a will flow through the latticed grid 12 into the associated isolated section 11b of the molding cavity 11a which is below the grid section 21a, as is shown in FIGS. 1 and 2 of the drawings.

While the description has been limited to grid section 21a, each of the other grid sections of the latticed grid 12 will have the same construction. Thus, grid sections 21b and 21c have a corresponding plurality of circumferentially spaced and offset radially extended ribs and concentrically spaced circumferential members which are in intersecting and interconnecting relation with each other. This radially extended rib and concentrically space circumferential members are connected to the adjacent elongated members which define the dividing blade slots 23b and 23c and inner wall of the frame 20 so as to form the associated windows or openings to create the lattice for the particular grid sections 21b and 21c and the latticed grid 12.

The number of windows or openings in a given grid section will depend on the size and shape of the grid segment and the relative strength of the slurry material desired after it sets or hardens after being poured into a given grid segment. If the slurry material when set or hardened is very fragile than more and smaller windows will be required on the latticed grid 12 to support, maintain, and prevent the slurry material from disintegrating during assembly and use.

As shown in FIGS. 9 and 10, the rib illustrated at 28g and elongated members as at 23a and 23b are tapered to facilitate pouring of the slurry material and to provide a means for more securely holding the slurry material in assembled position. Although only one rib 22g and the elongated member 23a and 23b are illustrated it will be understood that all the ribs and all the elongated members are so tapered for the object and purposes as set forth.

The dividing blades may take several forms such as the straight dividing blades 13a, 13b and 13c as shown in FIGS. 1, 2, 14 and 15 to 21 or the angled dividing blades 30 as shown in FIGS. 22 to 26. The dividing blades are made of stainless steel or other highly durable material so they can be reused during manufacture of the multi-sectioned and multi-colored solid products in accordance with the methods of the present invention.

Straight Dividing Blades

Thus, referring to these FIGURES of the drawing, the straight dividing blades 13a, 13b and 13c are generally flat members which have an angled front edge. Dividing blade 13a shown in FIGS. 15 to 18 has a left angled front edge 31 and the dividing blade 13c shown in FIGS. 19 to 29 has a right angled front edge 2. Additionally, the dividing blades will have a length greater than the dividing blade slots 22a, 22b and 22c into which the dividing blades are fitted. This extra length when taken with the respective oppositely angled front edges, enables the dividing blades to fit together when in assembled position in the dividing blade slots in the latticed grid 12 at their respective free ends so that they coact to form a given grid segment 22a, 22b and 22c in the latticed grid 12 to be filled with slurry material.

The dividing blades are each sized with a height approximately double that of the depth of the frame and the molding cavity when the latticed grill is in assembled position as shown in FIGS. 1, 2, and 14 of the drawings. Upper section 33 and 34 of the respective straight dividing blades 13a and 13c will be roughened, scored or knurled so they can be grasped or handled to position, removed, and reposition each of the respective dividing blades in a given dividing blade slot, as may be required to isolate a given grid segment on the latticed grid 12.

The lower or bottom edges as at 35 and 36 for the respective dividing blades 13a and 13b have long straight sections as at 37 and 38, sloped sections 39 and 40, and short straight sections 41 and 42. This profile for the bottom edge corresponds to the shape and contour of the molding cavity 11a and the annular support shelf 19 on the casting mold 11. The respective back edges of the dividing blades 13a and 13c also have shoulders as at 43 and 44 which shoulders fit and engage in assembled position the associated cut-outs 26a, 26b and 26c; in alignment with a given dividing blade slot 22a, 22b and 22c; on the inner wall of the annular frame 20. Thus, when the dividing blades are positioned in the given dividing blade slot the shoulders 43 and 44 and the cut-outs 26a, 26b and 26c act to hold and generally fix the given dividing blade 13a or 13c in assembled position in the given dividing blade slot. Dividing blade 13b will obviously have the same construction as dividing blade 13a as above described, all of which is shown in FIGS. 1, 2 and 14 of the drawings.

Angled Dividing Blades

Figure 22:
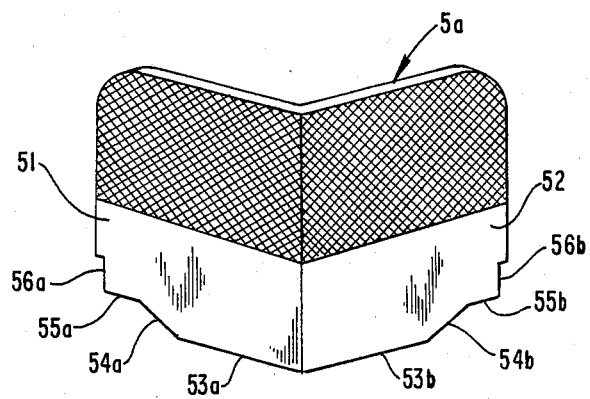
FIG. 22 is a perspective view of an angled form of dividing blade means adapted for use in the form of the invention shown in FIG. 1.

The angled dividing blades are also generally flat members. One form of angled dividing blade 50 is shown in FIGS. 22 to 26 which is bent to form a first section 51 and a second section 52 at an angle to each other and generally equal in length to each other, as shown in FIG. 22 of the drawings.

The lower or bottom edge of the angled dividing blade 50 has a long straight section 53a, a sloped section 54a, and a short straight section 55a on the first angled section 51 and similarly a long straight section 53b, a sloped section 54b, and a short straight section 55b on the second angled section 52 which in assembled position match the shape and engage the flat center section 14, the sloped section 15, and annular shelf 17 defining the mold cavity 11a in the casting mold 11.

Angled dividing blade 50 has a length such that the respective sections 51 and 52 of this dividing blade can fit into more than one of the dividing blade slots 22a, 22b and 22c.

The respective sections of any given angled dividing blade 50 must of course be disposed at an angle which will be a function of the angle at which the respective dividing blade slots are disposed in the latticed grid 12 and in which the angled dividing blade 50 is to be filled for a given apparatus for molding the multi-sectioned and multi-colored solid product in accordance with the methods of the present invention.

Thus while the angled dividing blade 50 is illustrated with only two segments 51 and 52 at an angle to each other, it will be clear that the angled dividing blade may have more than two segments so that it may fit into as many associated dividing blade slots as may be desired to facilitate and expedite the manufacture or fabrication of the multi-sectioned and multi-colored solid product.

As in the case of the single dividing blades 13a, 13b and 13c, the angled dividing blade 50 is also provided at the respective opposite ends from the middle or central section with end shoulders as at 56a and 56b, which when the angled dividing blade 50 is filled into the associated or correspondingly angled dividing blade slots 22a, 22b or 22c, will engage the cut-outs 26a, 26b or 26c, in the inner wall of the annular frame 20, as may be the case for a given position of the angled dividing blade 50. Thus, when the angled dividing blade 50 is positioned in the desired associated dividing slots, the shoulders 56a and 56b act to hold and generally fix the angled dividing blade 50 in assembled position in the given associated dividing blade slots 22a, 22b or 22c for the given position of the angled dividing blade 50.

The angled dividing blade 50 is also provided with upper sections as at 57a and 57b on the respective first section 51 and section 52 which are roughened, scored or knurled so the angled dividing blade 50 can be grasped or handled to position, remove and reposition the angled dividing blade during the steps of the methods in accordance with the present invention, all of which is shown in FIGS. 22 to 26 of the drawings.

When the latticed grid 12 is in assembled position in the casting mold 11 and angled dividing blade 50 is fitted into assembled position in the associated dividing blade slots 22a, 22b, or 22c in the latticed grid 12 it acts to isolate a given one of the grid segments 21a, 21b or 21c. When this grid segment is filled with the slurry material and the slurry material sets or hardens, the angled dividing blade 40 when removed permits the straight dividing blades 13a, 13b or 13c to now form additional grid sections that can be alternatively and selectively filled with different slurry mixtures by removing the straight dividing blade after one or the other of the grid segments are filled, thus expediting manufacture of the multi-sectioned and multi-colored solid product in accordance with the methods of the present invention.

Operation

In the operation of the Apparatus above described, at least one or more of the casting molds 11 are positioned on a supporting surface, now shown. A given latticed grid 12 is then fitted into assembled position on the grid shelf 17 of the casting mold.

Figure 27A:
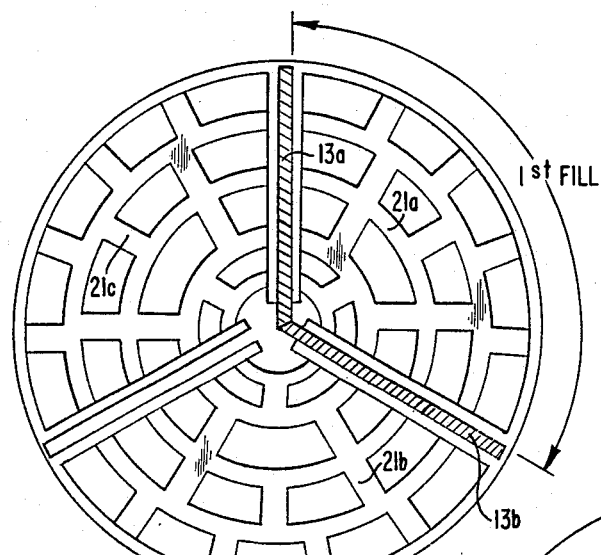
FIGS. 27A, 27B and 27C show diagrammatic sketches in top plan view of a latticed grid for forming a multi-sectioned and multi-colored solid product showing how straight single dividing blade means are used to isolate one of the grid sections from the other in accordance with the filling steps of one of the methods in accordance with the present invention for forming the final solid product.
Figure 27B:
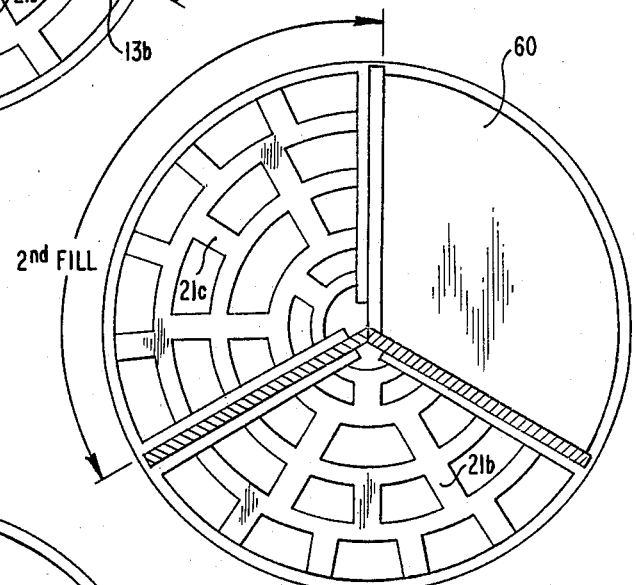
Figure 27C:
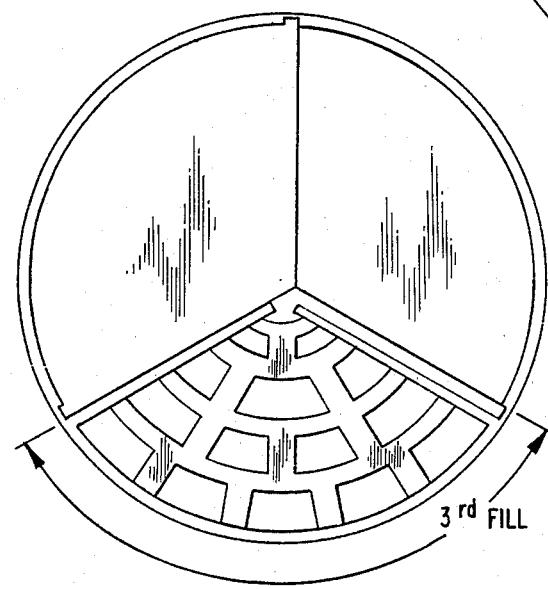

After the latticed grid 12 is positioned in the casing mold 11, the steps and method for positioning, removing, and repositioning, the straight dividing blades 13a, 13b and 13c for creating or forming the multi-sectioned, multi-colored product in accordance with this method of the present invention will be better understood by reference to FIGS. 27A, 27B and 27C of the drawings.

Thus, FIG. 27A shows that straight dividing blades 13a and 13b are first positioned in dividing blade slots 22a and 22b to isolate the first grid segment 21a of the latticed grid 12.

The first slurry mixture 60 with the desired color and texture is then poured into the isolated first grid segment 21a and allowed to set or harden. This can be expedited either by the addition of heat and/or the application of a vacuum to vaporize and/or draw off, and to recover the solvent used for making the slurry mixture.

FIG. 27b shows that after first slurry mixture 60 has set or hardened that straight dividing blades 13b and 13c are then positioned to isolate the second grid segment 21b of the latticed grid 12. Then a second slurry mixture 61 with a second desired color and texture is poured into the isolated second grid segment 21b and allowed to set or harden, expedited by heat and/or vacuum as in the case of the slurry for the first grid segment.

FIG. 27c shows that after second slurry mixture 61 has set or hardened, the straight dividing blades 13b and 13c are now removed and this isolates and provides the grid segment 21c of the latticed grid 12. Into this grid segment 21C is now poured a still further third slurry mixture 62 with a third desired color and texture. This third slurry mixture is again allowed to set or harden with the use of heat and/or vacuum to expedite this step of the process.

When all of the grid segments 22a, 22b and 22c have been filled and the respective first, second and third slurry mixture have set or hardened about the latticed grid 12, a single solid integral product is formed but the product so formed is disposed in the casting mold in an inverted position.

Each of the unitary finished solid products can now either be removed and fixed or fitted into the desired containers or they can be left and safely stored in the casting molds either for inventory purposes until they are needed or for shipment to the location where they are to be removed and fitted in such containers at a point remote from the formed and fabricating location.

Figure 28:
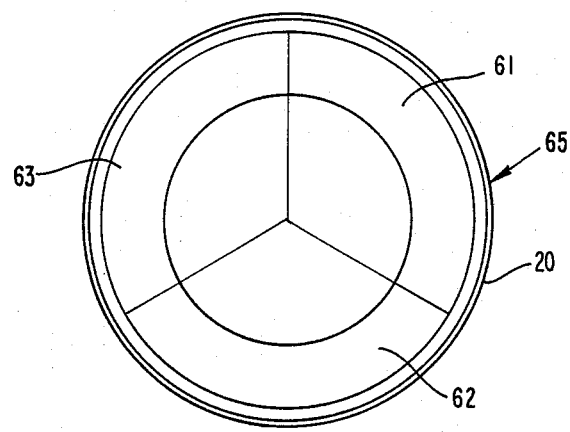
FIG. 28 is a top plan view of the final product obtained in accordance with the Apparatus and Method of the present invention.
Figure 29:
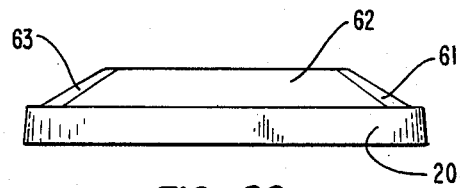
FIG. 29 is a side view of the final product shown in FIG. 28.
Figure 30:
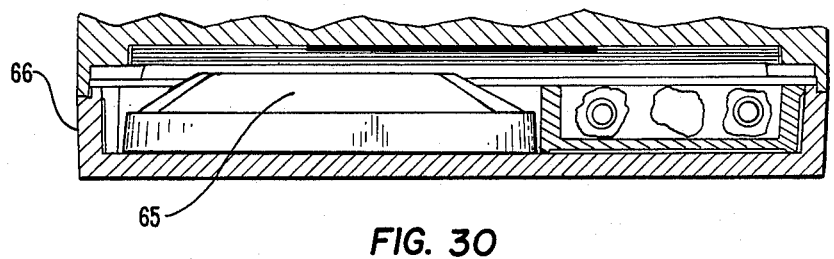
FIG. 30 is a cross-section of one form of compact showing the final product obtained in accordance with the Apparatus and Method of the present invention mounted therein.

FIGS. 28, 29 and 30 show the unitary final solid product as at 65 formed in accordance with the present invention as above described, and disposed in assembled position in a compact 66.

Figure 31A:
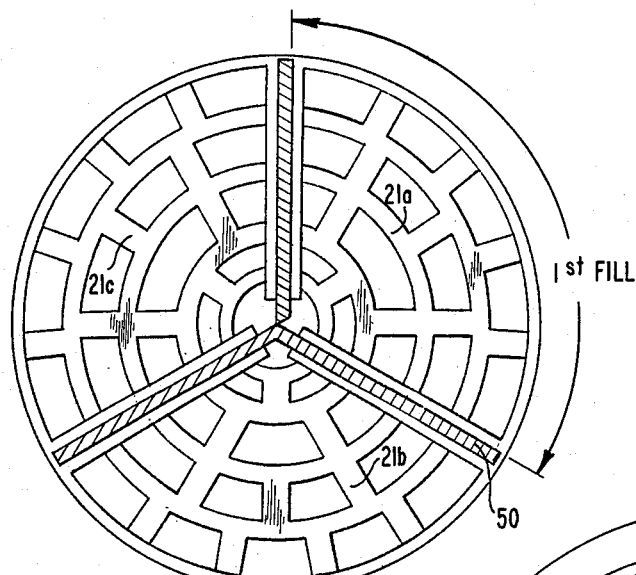
FIGS. 31A, 31B, and 31C show a diagrammatic sketch in top plan view of a latticed grid for forming a multi-sectioned and multi-colored solid product showing how an angled dividing blade means is used to isolate one of the grid sections from the other in accordance with the filling steps for another of the methods in accordance with the present invention for forming the final solid product, as shown in FIGS. 27, 28 and 29.
Figure 31B:
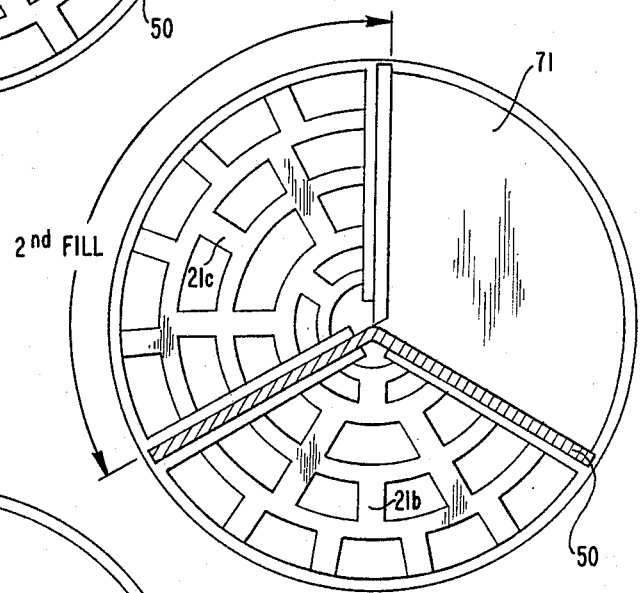
Figure 31C:
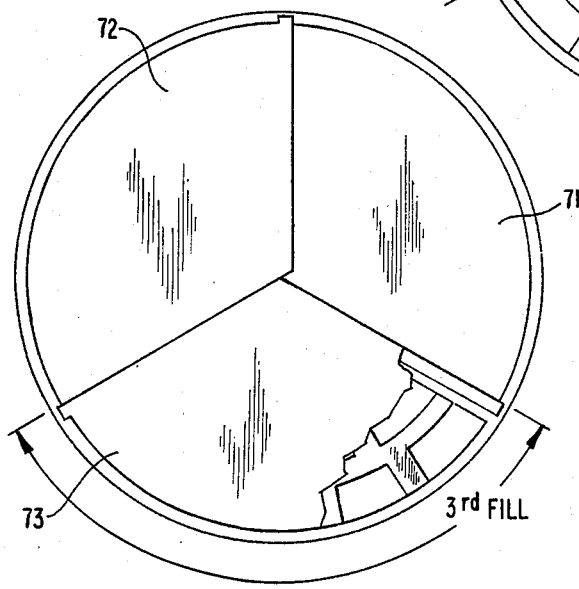

FIGS. 31a, 31b and 31c illustrates another method for creating or forming the multi-sectioned, multi-colored product in accordance with the present invention using the angled dividing blade 50 as above described.

The FIG. 31a shows the angled dividing blade 50 in operative association with a single dividing blade 13a to define and isolate from each other the first grid segment 21a, the second grid segment 21b and the third grid segment 21c of the latticed grid 12.

A first slurry mixture 71 of a given color and texture is now poured into the isolated first grid segment 21a and allowed to set or harden. Heat and/or vacuum can be used to expedite the setting or hardening process as the case may be.

After the first slurry mixture 71 is set and hardened, the straight dividing blade 13a is removed and a second slurry mixture 72 having a different color and texture is then poured into the isolated third grid segment 21c, again this second slurry mixture 72 is allowed to set or harden, heat and/or vacuum being applied to expedite setting or hardening as may be the case.

Thereafter, the angled dividing blade 50 is removed and the remaining isolated second grid segment 21b is then filled with a third slurry mixture 73 which when set or hardened completes the formation of a product identical with the product 65, which as in the above described method for the single dividing blades, includes as an integral part thereof the latticed grid 12.

This product may therefore as in the case of product 65 also be fitted into a compact or container as illustrated in FIGS. 28, 29 and 30 of the drawings.

Since the illustrated product is for eye shadow, the quantities of the various slurry materials and the size of the end product are relatively small, thus the actual dimension of product 65 will be on the order of 1.295" in circumference and approximately 0.5" in height. Those dimensions can be easily varied depending on the given application and the size requirements of the various materials to be used in a given form of the multi-sectioned, multi-colored product in accordance with the present invention.

DESCRIPTION OF ANOTHER EMBODIMENT OF THE INVENTION

FIGS. 32 to 45 inclusive illustrate another embodiment of the invention generally designated 110 in which the multi-sectioned and multi-colored solid product is formed rectangular rather than circular in plan view and the sections are formed by transverse dividers instead of radially extending dividers as in the form of the invention shown in FIGS. 1 to 31C of the drawings.

In this form of the invention the particular latticed grid may be used with or without a coacting mold dependent on the shape desired for the facing or visible surface of the finished product. If the facing or outer and visible surface of the finished product will be flat, then the multi-sectioned latticed grid can be placed and filled on any supporting flat surface and this will serve in place of the coacting mold for producing the multi-sectioned, multi-colored product in accordance with the methods of the present invention.

The illustrated form of the invention shown in FIGS. 32 to 45 shows the use of a coacting mold 111 for providing a finished product with a facing or visible surface that is generally flat or planar. It is used to insure that the desired surface on the finished product has the preferred finish and or texture as the case may be. The mold 111 is sized and shaped as a function of the multi-sectioned latticed grid 112 so that the latticed grid will match and mate with the mold when it is placed in assembled position to form the product in accordance with the apparatus and methods of this form of the invention.

Thus, referring to FIGS. 32 to 37 mold 111 is shown as having a generally rectangular molding cavity 113 defined by a flat bottom member 114 and side walls 115 and 116 and end walls 117 and 118 connected about the periphery of the flat bottom member 114. The side walls 115 and 116 and the end walls 117 and 118 may be disposed at an angle so they diverge slightly from each other. This enables the latticed grid 112 to be fitted into and easily removed from the mold 111 after the finished product is formed as is more fully described below.

The side walls 115 and 116 and the end walls 117 and 118 will have a height preferably as a function of the thickness of the latticed grid. However, those skilled in the art will readily recognize that the side walls and end walls only need to be high enough to prevent the latticed grid 112 from changing position during the formation of the multi-sectioned, multi-colored finished product in accordance with the methods of the present invention. Further, in order to hold the mold in position during the formation of the finished product, an annular support member as at 119 is connected about and continuous with the uppermost end of the respective side walls 115 and 116 and the end walls 117 and 118 all of which is shown at FIGS. 32, 33, 34, 35, 36 and 37 of the Drawings.

Referring now to FIGS. 32, 33, 38, 39, 40, 41 and 42 the latticed grid 112 is also shown as rectangular in plan view with a predetermined length, width, and height to provide the desired sized and rectangularly shaped finished product such as pancake make-up, paint color composition or the like which is adapted to fit into position in a compact, paint box or other container.

Since the latticed grid as hereinafter described becomes an integral part of the finished product it serves to define the peripheral edges of the finished product in the form of spaced side walls 120 and 121 which are respectively connected to opposite sides of end walls 122 and 123. The side walls and end walls provide the predetermined sized rectangular shape of the finished product. Additionally, the side walls 120 and 121, and end walls 122 and 123 will have a height which will determine the thickness of the finished product.

Connected between the side walls and the end walls is a grid member generally designated 124. Grid member 124 is divided into three segments A, B and C by transversely disposed zig-zag dividing slots as at 125 and 126 which are formed by corresponding zig-zag and spaced partitions 125a and 125b for dividing slots 125 and 126a and 126b for dividing slot 126 which are respectively connected at opposite ends along the medial spaced inner walls of the spaced sidewalls 120 and 121. The zig-zag dividing slots 125 and 126 are operatively associated with matching and mating zig-zag dividing blades 127 and 128 to establish, form and isolate the three segments or compartments A, B and C so that the multi-sectioned, multi-colored final product is formed in accordance with the methods of the present invention, all of which is shown in FIGS. 32, 33, 38, 39, 40, 41, 42, 43, 44 and 45 of the drawings.

FIGS. 32, 33, and 38 to 45 further show that grid member 124 has longitudinally and transversely disposed and interconnecting support stringers as at 130 and 131 for segment A which are connected to the inner walls of the side walls 120 and 121 end wall 122 and the adjacent side of the zig-zag partition 125a. The intersecting support stringers are so spaced that they define openings or windows therebetween as at 132a, 132b, 132c, 132d, 132e, 132f, 132g and 132h through which the coloring composition can pass during the steps of the method of forming the multi-sectioned, multi-colored solid product in accordance with the present invention. Similarly for segment B the longitudinal, transverse and interconnecting support stringers 133 and 134 are connected between the spaced inner walls of sidewalls 120 and 121 and between the spaced adjacent sides of the zig-zag partitions 125b and 126a to define the openings or windows therebetween as at 135a, 135b, 135c, 135d, 135e and 135f through which the coloring compositions can pass in the formation of the multi-sectioned, multi-colored solid product in accordance with the present invention. And similarly for segment C the longitudinal, transverse and intersecting support stringers 136 and 137 are also connected between the inner walls of the sidewalls 120 and 121 and between the inner walls of the end wall 123 and the adjacent side of the zig-zag partition 126b to define the openings or windows 138a, 138b, 138c, 138d, 138e, 138f, 138g and 138h for the same purpose and object as the windows 132a to h and 135a to f.

Figure 42:
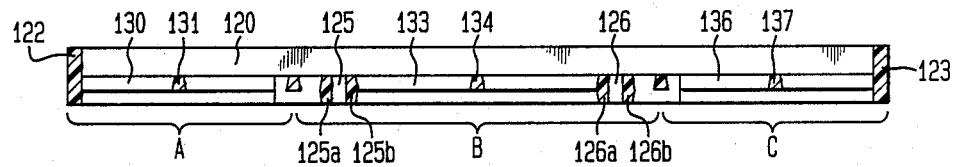
FIG. 42 is a cross-section taken on line 42—42 of FIG. 38.
Figure 42A:
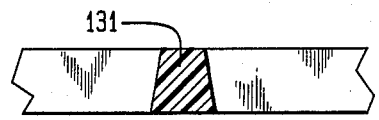
FIG. 42A is a cross-section taken on line 42A—42A of FIG. 38.
Figure 43:
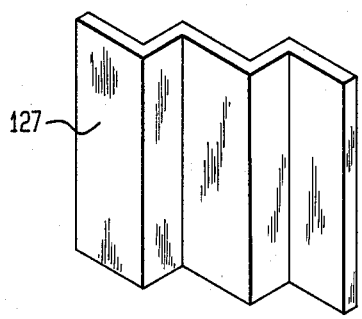
FIG. 43 is a side perspective view of the dividing blade shown in FIG. 33.
Figure 44:
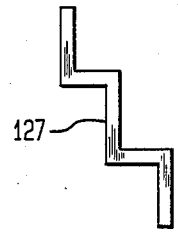
FIG. 44 is a top plan view of the dividing blade shown in FIGS. 33 and 43.
Figure 45:
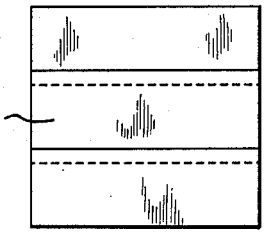
FIG. 45 is a front elevational view of the dividing blade shown in FIGS. 33, 43 and 44.
Figure 46:
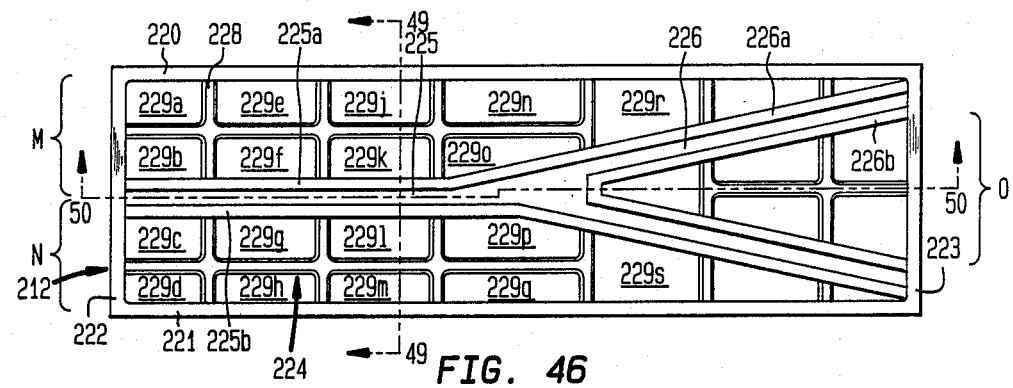
FIG. 46 is a top plan view of still another embodiment of the latticed grid.
Figure 47:
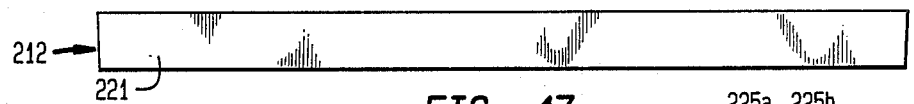
FIG. 47 is a side elevational view of the further embodiment of the latticed grid shown in FIG. 46.
Figure 48:
FIG. 48 is an end elevational view of the further embodiment of the latticed grid shown in FIG. 46.
Figure 49:
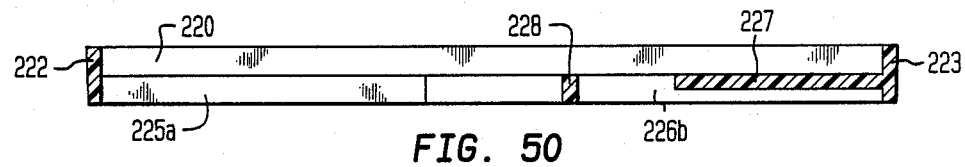
FIG. 49 is a cross-section taken on line 49—49 of FIG. 46.
Figure 50:
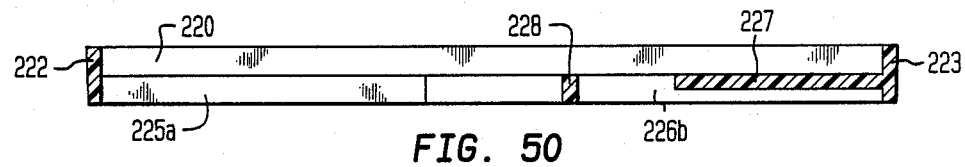
FIG. 50 is a cross-section taken on line 50—50 of FIG. 46.
Figure 51:
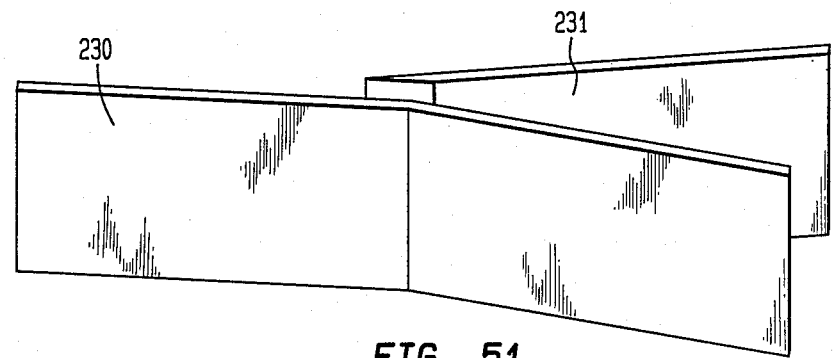
FIG. 51 is an exploded side perspective view of the dividing blade operatively associated with the embodiment of the latticed grid shown in FIG. 46.
Figure 52:
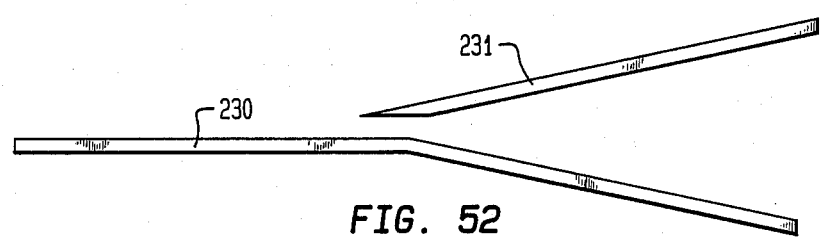
FIG. 52 is an exploded top view of the dividing blades shown in FIG. 51.

As in the form of the invention shown in FIGS. 1 to 31c, the longitudinal and transverse support stringers 130, 131, 133, 134, 136 and 137 have their respective sides as is illustrated in FIG. 42A for support stringer 131 so that they are at a converging angle to permit the color compositions to flow freely through the openings or windows during formation of the multi-sectioned, multi-colored solid product formed in accordance with the methods of the present invention.

The dividing blades 127 and 128 are formed and shaped to fit the dividing slots 125 and 126 and will be long enough to be moved into and out of engagement with the respective dividing slots and to act as a dam to prevent the coloring composition poured into one segment from flowing into the adjacent segment during formation of the multi-sectioned, multi-colored solid product in accordance with the methods of the present invention.

Formation Of Product In Accordance With This Embodiment

Figure 32:
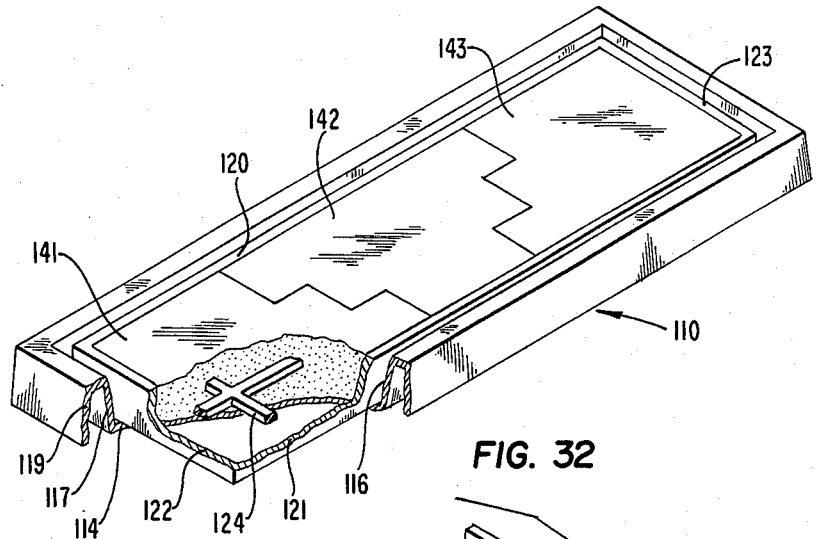
FIG. 32 is a top perspective view of another embodiment of the invention filled with three different colored slurry mixtures partly broken away in vertical section to show the casting mold, the latticed grid and a portion of one of the colored slurry mixtures and a fragment of the grill shown embedded therein.
Figure 33:
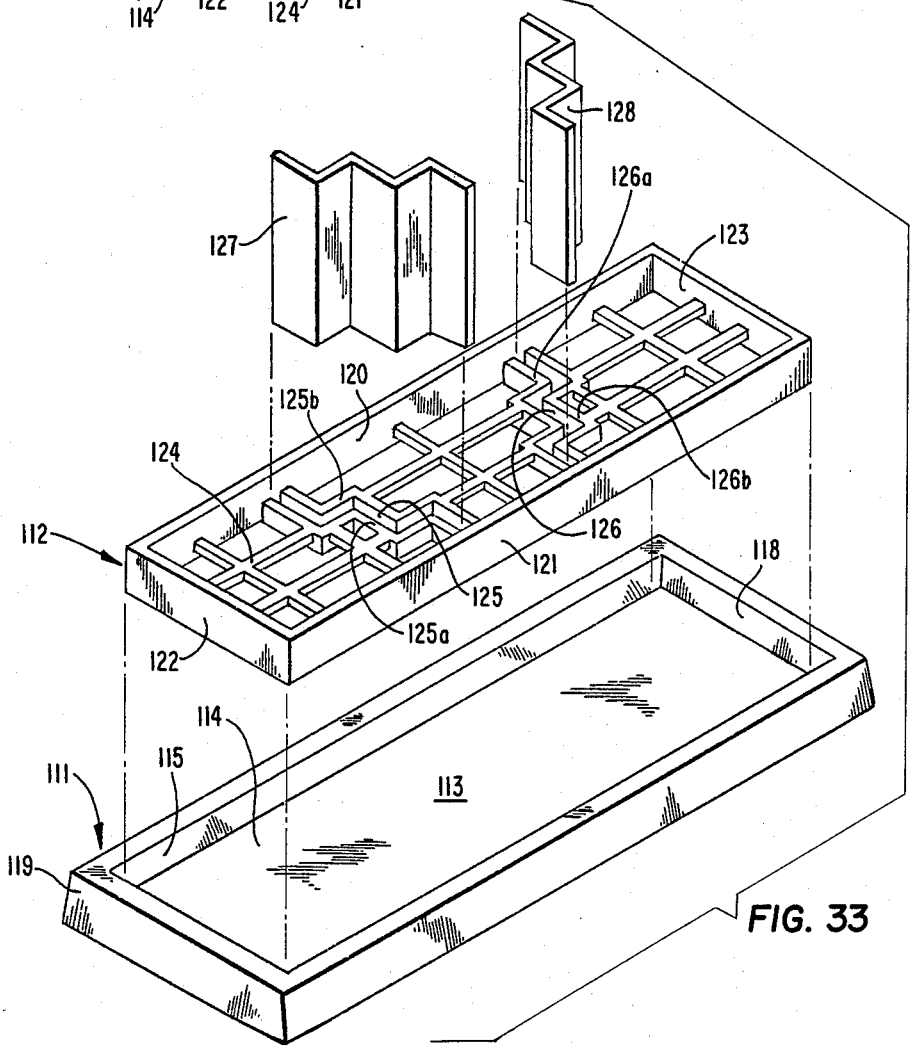
FIG. 33 is an exploded view of the embodiment of the invention shown in FIG. 32 showing the casting mold, the latticed grid, and the dividing blades operatively associated therewith.
Figure 34:
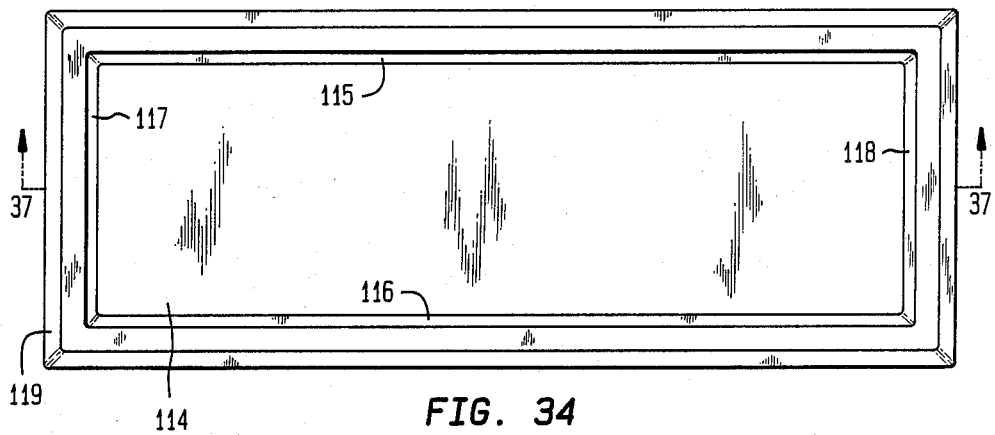
FIG. 34 is a top plan view of the casting mold shown in FIGS. 32 and 33.
Figure 35:
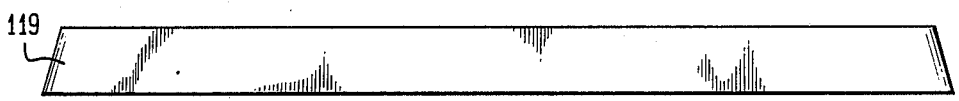
FIG. 35 is a side elevational view of the casting mold shown in FIGS. 32, 33 and 34.
Figure 36:
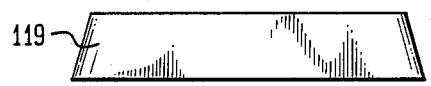
FIG. 36 is an end elevational view of the casting mold shown in FIGS. 32, 33, 34 and 35.
Figure 37:
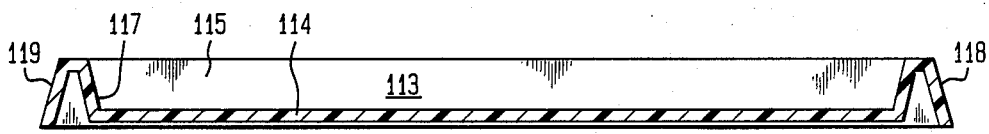
FIG. 37 is a cross-section taken on lines 37—37 of FIG. 34.
Figure 38:
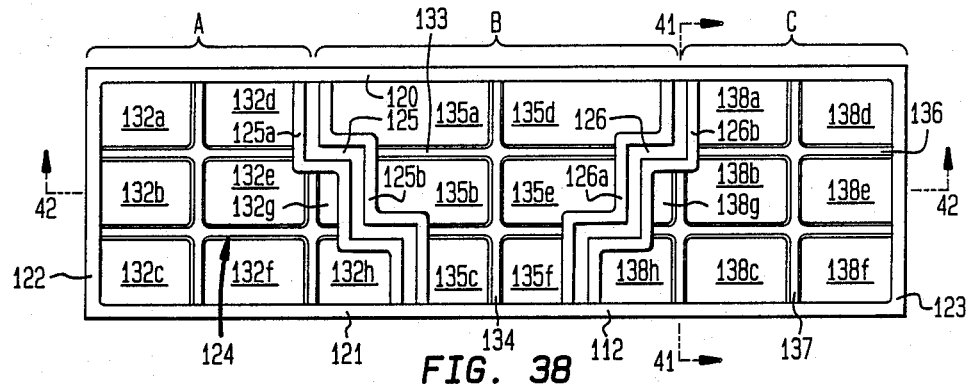
FIG. 38 is a top plan view of the latticed grid shown in FIGS. 32 and 33.
Figure 39:
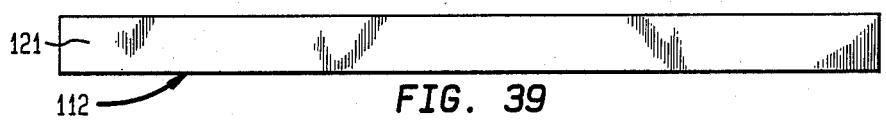
FIG. 39 is a side elevational view of the latticed grid shown in FIGS. 32, 33 and 38.
Figure 40:
FIG. 40 is an end elevational view of the latticed grid shown in FIGS. 32, 33 and 38.
Figure 41:
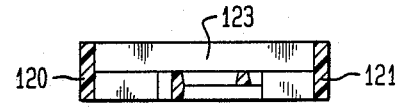
FIG. 41 is a cross-section taken on line 41—41 of FIG. 38.

The formation of the multi-sectioned, multi-colored solid product in accordance with this embodiment of the invention will be better understood by reference to FIGS. 32, 33 and 38.

Thus, either a flat surface, not shown, or the casting mold 111 is provided and the latticed grid 112 is placed either on the flat surface, not shown, or fitted in assembled position in the compartment 113 of the casting mold 111 as shown in FIG. 33. The dividing blades 127 and 128 are positioned in and extended through the respective dividing blade slots 125 and 126 until they engage and bottom against the flat surface, not shown, or abut the bottom member 114 of the compartment 113 in the casting mold 111 to segregate and isolate the grid segments A, B and C of the latticed grid one from the other.

The first slurry mixture 141 having the desired color, texture and composition is prepared and is now poured into and through the openings or windows 132a to 132h and about the intersecting longitudinal and transverse support stringers 131 and 132 of the segregated and isolated grid segment A until the slurry mixture reaches the level of the upper edges of the sides and ends of the latticed grid 112 and the slurry mixture is then allowed to set or harden. As was described for the first embodiment of the invention, setting or hardening of the slurry mixture can be expedited by heating or by vacuum to draw off the solvents which can be recovered for reuse as best suits the procedures for the particular solid product being formed.

After the first slurry mixture 141 in grid segment A has set or hardened, dividing blade 127 is carefully removed to prevent damaging the set and hardened first slurry mixture. Now a second slurry mixture 142 with the desired color, texture and composition is next poured into and through the openings or windows 135a to 135f and about the intersecting support stringers 133 and 134 of the second grid segment B adjacent to the set and hardened slurry mixture 141 in segment A and the second slurry mixture is allowed to set and harden with or without the application of heat or vacuum. Then, after the second slurry mixture 142 has set or hardened dividing blade 128 is now carefully removed and a third slurry mixture 143 of the desired color, texture and composition is poured into and through the openings or windows 138a to 138h and about the intersecting support stringers 136 and 137 of the third and remaining grid segment C and allowed to set or harden in the same manner as slurry mixtures 141 and 142 to complete and form a unitary solid product in which the latticed grid 124 is embedded in and surrounds the set and hardened slurry compositions to strengthen and keep the unitary solid product intact and to facilitate handling, shipping, storing or assembly of the product in a compact or other container.

Although as above described the grid segments were filled in the A, B and C order, those skilled in the art will readily recognize that any other desired order could be used and any number of additional grid segments could be established by adding additional transverse or longitudinal dividing slots without departing from the scope of the present invention.

Further while the latticed grid is shown as being rectangular for this illustrated form of the invention, the latticed grid can take other shapes and sizes which also will not depart from the scope of the present invention.

ANOTHER EMBODIMENT OF THE LATTICED GRID

FIGS. 46 to 52 of the drawings show still another form of latticed grid generally designated 212 which is also rectangular in plan view. Latticed grid 212 differs from the latticed grid 112 in that the dividing blade slots 225 and 226 are so formed that they provide an initial or letter in the unitary finished product.

Thus, FIGS. 46 to 52 show that the latticed grid 212 has a predetermined length, width and height defined by the spaced side walls 220 and 221 and end walls 222 and 223. Connected medially along the inner surfaces of the side walls 220 and 221, and end walls 222 and 223 is a grid 224.

The grid 224 has the dividing blade slots 225 and 226 formed therein by spaced partitions 225a and 225b for dividing blade slot 225 and 226a and 226b for dividing blade slot 226 in the shape of a letter Y. And similar to the earlier described forms of the invention the grid 124 includes intersecting longitudinal and transverse support stringers as at 227 and 228 so connected to each other and to the inner surface of the sidewalls and end walls and the adjacent surfaces of the partitions which define the dividing blade slots 225 and 226 that openings or windows are formed as at 229a, 229b, 229c, 229d, 229e and 229f, etc.

Coating with the dividing blade slots 225 and 226 are dividing blades 230 and 231. Dividing blade 230 is a straight dividing blade and 231 is an angled dividing blade, dividing blade 230 being beveled as at 232 so that when the dividing blades 230 and 231 are assembled in the dividing blade slots 225 and 226 they create the initial or letter Y and form grid segments as at M, N and O in the latticed grid 212 about the dividing slots 225 and 226.

In the use of this latticed grid, the dividing blades 230 and 231 are first positioned in the dividing blade slots 225 and 226. Then a first slurry mixture is used to fill segment M, a second slurry mixture is used to fill segment N, and a third slurry mixture is used to fill Segment O in the same manner as was above described for the form of the invention shown in FIGS. 32 to 45 of the drawings.

Then after all of the respective slurry mixtures have set or hardened the dividing blades 230 and 231 are carefully removed and the dividing blade slots 225 and 226 are filled with a fourth slurry mixture of the desired color, texture and composition to bring out the initial or letter against the contracting backgrounds of the colored slurry mixtures in the segments M, N and O. This fourth slurry mixture is also allowed to set and harden to complete the unitary solid product in accordance with the methods of the present invention.

Thus, an improved, relatively simple and versatile apparatus and method has been above described for forming any of a variety of multi-sectioned and multi-colored solid products having any predetermined geometric or other desired shape.

It will be understood that the present invention is not limited to the specific embodiment of the Apparatus and Methods as shown and described herein, but that the same may be modified and changed without departing from the scope of the invention as now defined by the following claims.

What is claimed is:

1. Apparatus for making a multi-sectioned multi-colored solid product of predetermined size and shape from different slurry mixtures comprising,
    a. support and mold means having a cavity to define generally the size and shape of the product, said cavity having a bottom surface;
    b. latticed grid means spaced from said bottom surface in said cavity,
    said latticed grid means having at least one slot to define slurry receiving segments in said cavity,
    c. dividing means removably positionable in said at least one slot so that each said slurry receiving segments can be alternatively and selectively filled with one of the different slurry mixtures whereby said latticed grid means is so constructed and arranged with respect to said support and mold means that it becomes generally integral with the slurry mixtures after they solidify in the formation of the solid product of desired size and shape.

2. In the apparatus as claimed claim 1 wherein said latticed grid means includes, a base structure having a plurality of random openings in at least each said slurry receiving segment, said at least one slot being between said slurry receiving segments, and an upwardly extending wall to enclose each said slurry receiving segment in said cavity.

3. In apparatus as claimed in claim 2 wherein said latticed grid means is generally circular in shape, said wall being disposed annularly thereabout, and said at least one slot extends radially inward from said wall.

4. In the apparatus as claimed in claim 2 wherein said at least one slot has two ends, both of which are adjacent said wall so that said dividing means is in contact with said wall when in said at least one slot.

5. Apparatus for forming a multi-sectioned multi-colored solid product from different slurry mixtures comprising:
  a. support means,
  b. carrier means removably mounted in said support means including, an upwardly extending wall about the periphery of the carrier means, and grid means connected to said wall,
  said grid means having intersecting and interconnected members defining a plurality of spaced openings in which slurry mixtures can flow, and at least one dividing blade slot to define spaced slurry receiving segments,
  c. dividing blade means removably positionable in said at least one dividing blade slot,
  said dividing blade means being so constructed and arranged as to be alternatively and selectively positioned and repositioned in said at least one dividing blade slot to permit each of the slurry receiving segments in the grid means to be filled with one of the different slurry mixtures during the formation of the solid product.

6. Apparatus for forming a multi-sectioned multi-colored solid product from different slurry mixtures comprising:
  a. support means,
  b. carrier means removably mounted to said support means having, an upwardly extending wall about the periphery of the carrier means, and grid means connected to said wall,
  said grid means including intersecting and interconnecting members forming a plurality of openings in which slurry mixtures can flow, and means extending radially inward from said wall means to provide spaced dividing blade slots extending inwardly from said wall to define a plurality of spaced slurry receiving segments in said grid means,
  c. dividing blade means removably positionable in said spaced dividing blade slots to isolate with said wall at least one of said spaced slurry receiving segments in said grid means so that said isolated slurry receiving segment can receive one of said different slurry mixtures,
  said dividing blade means being removable relative said grid means so as to be repositionable in said spaced dividing blade slots to isolate at least one other of said spaced slurry receiving segments for the receipt of another and different one of said different slurry mixtures.

7. In the apparatus as claimed in claim 5 wherein, said support means is sized and shaped to provide any desired shape for the solid product.

8. In the apparatus as claimed in claim 5 wherein, the support means is sized and shaped to provide a desired geometric shape for the said product.

9. In the apparatus claimed in claim 5 wherein,
  a. said support means is sized and shaped to provide a desired size and shape for the solid product, and
  b. the carrier means is sized and shaped to fit in the support means.

10. In the apparatus as claimed in claims 5 or 6 wherein, said carrier means is so constructed and arranged with respect to said support means that it becomes generally integral with the solid product upon the formation of the solid product, said integral unit being separable from the support means.

11. In the apparatus as claimed in claims 5 or 6 wherein,
  a. said support means is sized and shaped to provide a desired size and shape for the solid product,
  b. said support means has a medially disposed shaped central section for forming at least a portion of said desired shape, an annular base about the periphery of said support means, and a support shelf being disposed inwardly of said annular base, said support shelf being adapted to support said carrier means at a spaced distance above said shaped central section during formation of the solid product.

12. In the apparatus as claimed in claims 5 or 6 wherein,
  said carrier means is sized and shaped for removable connection to the support means,
  said wall on said carrier means has an inner surface,
  said intersecting and interconnected members are connected to the inner surface of the wall, and
  said at least one dividing blade slot is connected at one end to said inner surface of the wall on the respective sides thereof to said intersecting and interconnected members.

13. In the apparatus as claimed in claim 2, including a shoulder in said cavity for supporting said base structure and maintaining said latticed grid means in spaced relation to said bottom surface of said cavity.

* * * * *